Oct. 9, 1945.     J. W. WOHLHIETER     2,386,732
TUBE MOUNT
Filed April 7, 1944
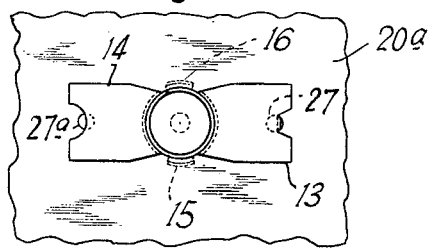
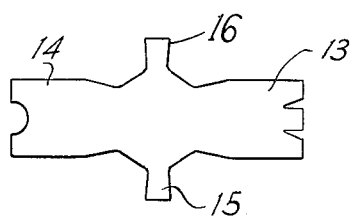
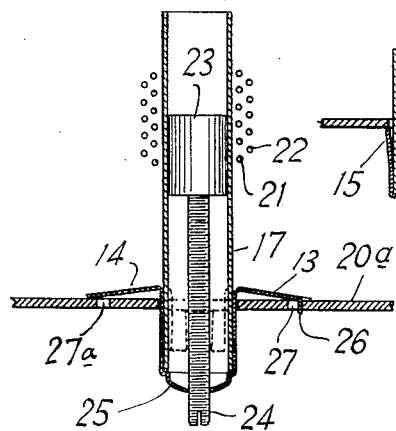
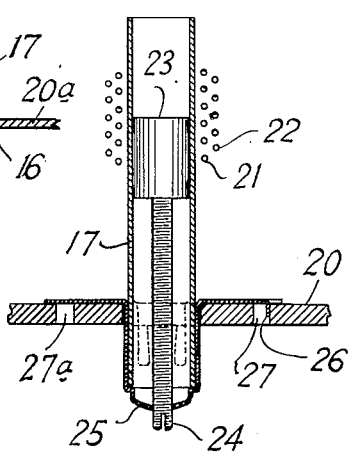
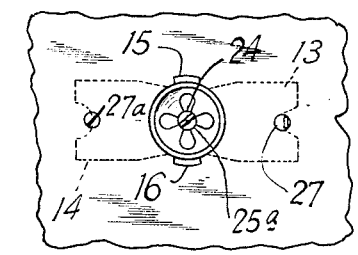
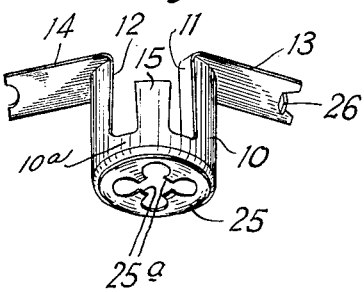
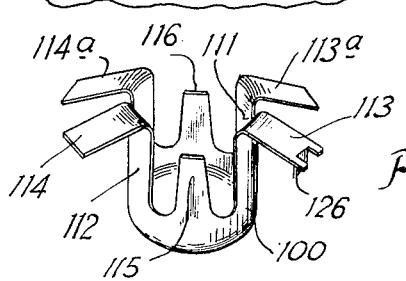
INVENTOR.
Joseph W. Wohlhieter
BY
Ramsey, Kent & Chisholm
ATTORNEYS Patented Oct. 9, 1945

2,386,732

UNITED STATES PATENT OFFICE 2,386,732

TUBE MOUNT

Joseph W. Wohlhieter, East Orange, N. J., assignor to The Palnut Company, Irvington, N. J., a corporation of New Jersey Application April 7, 1944, Serial No. 530,073

6 Claims. (Cl. 248—361)

My invention relates to improvements in tube mounts and has to do, more particularly, with the provision of a spring clamp by which a post or the like such as a tubular member of ordinary form may be attached firmly to a supporting object such as a sheet metal plate without resort to the use of such accessory means as rivets, screws, spot welding and the like. A spring clamp embodying the concepts of my invention has especial aptitude for the mounting of small tubular elements such as are comprised in radio-frequency chokes, inductances, intermediate - frequency transformers and like structures commonly mounted upon the chassis of radio and other electronic equipment.

The mounting of such tubular elements upon sheet metal chassis on a factory-production basis has presented a number of problems which have not, hitherto, been solved in an entirely satisfactory manner. Such elements are desirably readily detachable so as to enable replacement if and when the element becomes defective. Equipment incorporating such elements is often subject to vibration under conditions of use and, unless the mounting be inherently capable of resisting tendency toward wobbling and loosening, microphonic and other disturbing effects may be experienced. The mounting should be capable of facile installation with a minimum expenditure of time; no special tools should be required for the purpose; and the part should be of simple construction preferably susceptible of formation in a single piece, from inexpensive stock, and by conventional machinery.

It is to the achievement of these and other desiderata that my invention is particularly directed and it is, accordingly, a salient object of my invention to provide a spring clamp for mounting a tubular member on a plate-like object which clamp is inexpensive to produce, simple to install, adaptable to tubular members and supporting plates within a considerable range of tolerances, and dependable, once installed, to insure against wobbling, looseness, and insecurity.

It is a further object of my invention to provide a spring clamp for the mounting of a tubular member upon a plate member, which clamp will effectively resist rotation of the tubular member around its axis of mounting.

Still a further object of my invention is to provide such a spring clamp for the mounting of a tubular member upon a plate member, which clamp is provided with integral means for the reception of an adjustable screw-threaded member movable along the axis of the member.

Further objects, and objects relating to details and economies of construction and use will more definitely appear from the detailed description to follow.

My invention is clearly defined in the appended claims. In the claims, as well as in the description, parts are identified by specific names for convenience, but such nomenclature is intended to be as generic, in its application to similar parts, as the prior art will permit. The best form in which I have contemplated applying my invention is illustrated in the accompanying drawing forming a part of this specification, in which:

Fig. 1 is a perspective view drawn to a larger scale than that of Figs. 2 through 7, illustrating what I regard to be the preferred form of spring clamp embodying my invention;

Fig. 2 is a vertical sectional view of the spring clamp shown in Fig. 1 as installed in a plate-like section of a radio chassis for the mounting of an intermediate - frequency transformer provided with an adjustable iron core.

Fig. 3 is a vertical sectional view of an assembled structure similar to that shown in Fig. 2, the plate-like chassis section, however, being of lesser thickness;

Fig. 4 is a vertical sectional view of a portion, only of the structural assembly shown in Fig. 3, the view being taken from a position 90° displaced with respect to that of Fig. 3 and illustrating the shorter castellations or latching tongues of the spring clamp in abutment with the underface of the plate-like chassis section;

Fig. 5 is a top-plan view of the assembly shown in Fig. 3, the transformer windings being omitted for the sake of clarity in illustration;

Fig. 6 is a bottom plan view of the same structure;

Fig. 7 is a plan view of the sheet metal blank from which the spring clamp of Fig. 3 may be formed; and Fig. 8 is a perspective view of a modified form of my spring clamp wherein the plate-overlying wing portions are narrower, and four in number.

Similar reference characters refer to similar parts throughout the several views.

In a broad sense, my invention finds embodiment in a spring clamp or spider for mounting a post such as a tube or the like on a plate member provided only with a simple hole. The spring clamp comprises a castellated sleeve or hub within which the tube member may be snugly placed and resilient arms or wing portions extending laterally outwardly from certain of the sleeve castellations. These wing portions overlie one face of the plate when the sleeve is inserted in the plate hole and initially contact with the plate at positions spaced away from the sleeve proper. The wing portions are springy and are, by reason of their initial relatively marginal contact with the plate, caused to flex and be placed under resilient stress by the act of fully seating the clamp upon the plate. Means are provided for latching the clamp within the plate hole, which means are so placed as to insure maintenance of a portion at least of the flexure imparted to the wing portions during assembly, the stress of which maintained degree of flexure serves to prevent wobbling of the clamp in the plate hole. Means are also desirably provided for positively preventing rotation of the clamp and its tube on the plate-hole axis and, when such rotation is thus precluded, additional means such as a screw-adjustable accessory member may be mounted for threaded assembly in a web formed across the end of the sleeve remote from its wing portions.

Referring, now, to Figs. 1 to 7 of the accompanying drawing wherein I have illustrated what I regard to be the preferred embodiment of my invention, the spring clamp shown in Fig. 1 is a simple, generally cup-shaped, member capable of being pressed out from a flat blank (such as shown in Fig. 7) by relatively simple dies (not shown). This spring clamp is essentially composed of a multi-split or castellated sleeve portion 10 of generally cylindrical configuration provided with opposed castellations 11, 12, bearing, at their outer extremities, wing portions 13, 14 respectively, which extend laterally outwardly from the castellations 11, 12 proper and assume, unstressed, an acute angle (i. e. one of somewhat less than 90°) with respect thereto as shown in Fig. 1. One of the wing portions is provided with a small key tongue 26 which depends from its extremity.

The entire clamp is preferably formed from spring steel, hardened and tempered, and the wing portions have, accordingly, the character of leaf-springs. Between the wing-bearing castellations 11, 12, are castellations 15 (and 16, not visible in Fig. 1) which are shorter than those 11, 12 by an extent amounting approximately to the thickness of the heaviest gauge plate with which the clamp is designed for use. These shorter castellations diverge slightly so as to have greater spacing from each other at their free ends and serve, as shown in Fig. 4, as latching tongues engageable with the plate 20a by abutment with its under face.

The sleeve portion 10 of the one-piece clamp includes a sheet metal annulus 10a from the upper edge of which extend the arms or castellations 11 and 12 and the latching tongues 15 and 16. The lower edge of the annulus 10a merges into a web 25 which extends across the annulus and constitutes the bottom of the cup formation. The web 25 is so formed as to provide thread-engaging means 25a which act as a female thread and resiliently engage a screw-threaded stem 24.

The device illustrated in Figs. 1 through 7 is, by virtue of its acute-angle disposed leaf-spring-like wing portions 13, 14, adaptable for use upon plates within a wide range of gauges, as demonstrated by a comparison of the difference in thickness between the plates 20 and 20a of Figs. 2 and 3 respectively. Where the fitting is formed from hardened and tempered spring steel (which is inherently quite stiff), only a very slight distortion or flexure of the wing portions 13 and 14 upon the plate face will suffice to give adequate stability to the mounting. Thus, the fitting is capable of installation upon a thin plate such as illustrated in Fig. 3. Since, however, the wing portions 13 and 14 are flexible, the fitting may be employed with a plate of far greater thickness, as shown at 20 in Fig. 2, the wing portions in such instance being stressed into a plane of substantial perpendicularity with respect to the sleeve proper. In such a case, the mounting is quite rigid in character, which factor may be especially advantageous in installations where the thick plate was prescribed for ruggedness.

One of the important features of the fitting illustrated resides in the constrictive effect produced by the wing portions 13, 14 upon the sleeve castellations 11, 12 and resulting from flexure of the wing portions by their being pushed against the plate face. Ordinarily, the tubular member or post 17 is first placed within the sleeve and the assembly is then pressed into the hole in the plate. The act of seating the fitting so that the short castellations 15, 16 latch upon the under face of the plate effects upward flexure of the wing portions 13, 14 and also tends to displace the castellations or arms 11 and 12 of the sleeve inwardly against the tube 17 disposed therebetween. The action is somewhat analogous to that characterizing the draw-chuck or collet commonly employed on the head stock of lathes and similar machine tools, and a very secure anchorage of the tube 17 is thus afforded.

As indicated in the introductory portion of this specification, the present invention in tube mounts has especial aptitude in the attachment of radio, and other electronic elements, to the chassis of the equipment. I have, in Figs. 2, 3 and 4, illustrated my invention as applied to the chassis mounting of an intermediate frequency transformer upon a radio set chassis 20 or 20a. Such a transformer comprises a tubular support 17 of fibre or the like which bears primary and secondary windings shown schematically and depicted by reference numerals 21 and 22. A ferrous core 23 axially movable in the tube 17 is provided to enable adjustment of the effective coupling between the windings. For this purpose, a threaded stem 24 may be employed to support the core 23, which stem is screw-threadedly engaged with a nut-constituting end wall or web 25 formed across the end of the spring clamp remote from the wing portions 13 and 14. The web 25 may be formed with a plurality of helically disposed spring fingers 25a (four shown). These enter the thread of screw 24 and yieldingly hold the same against fortuitous rotation, as is known in the art.

Where such a rotatively adjustable accessory is to be provided for, it is desirable that some means such as the key-tongue 26 be formed in one or more of the wing portions, which tongue may be engaged with a small perforation 27 in the plate to positively prevent rotation of the clamp (and its clutched tube) with respect to the plate portion 20 of the chassis.

The modified form of clamp shown in Fig. 8 is basically similar to that illustrated in Fig. 1, the distinction being, for the most part merely in the number (four) of the wing portions 113, 113a and 114, 114a provided. Where, as here, the sleeve 100 comprises wing-bearing castellations 111, 112 which are branched or bifurcate adjacent their terminal, the wing portions 113, 113a and 114, 114a may spread somewhat, as shown, to give enhanced lateral stability against wobbling. Moreover, due to the relatively narrow width of each wing portion, all, or a major portion 126 thereof, may be terminally bent down to engage with a rotation-preventing plate-hole 27. In this form of clamp, as well as in that of Fig. 1, the short castellations 115, 116, by their abutment with the underside of the plate, coact with the wide spread of the wing portions upon the top of the plate to prevent wobble of the mounting in a direction at right angles to the common axis of the wing portions.

From the foregoing, the mode of assembly and the operative utility of the devices illustrated should be self-evident. Preferably the tube 17 is inserted in the spring clamp before the latter is pressed into the plate hole although, under some circumstances, subsequent installation may be desirable. In pressing the clamp in place, no special equipment is required. The operation may, however, be accomplished by automatic machinery instead of manually, if such would have production advantage in the saving of time or personnel. To detach my clamp to enable replacement of the tubular element requires merely that the tongues or short castellations 15, 16 (or 115, 116 in the case of the Fig. 8 embodiment) be squeezed inwardly before the clamp is lifted out. If but moderate care be exercised in the removal procedure, the clamp may be re-used repeatedly. The adaptability of the clamp to plates of a range of thicknesses is self apparent from a comparison of the relationships shown in Figs. 2 and 3, and it will be similarly evident therefrom that considerable variation in tube diameter may be accommodated without insecurity.

While I have shown two embodiments of my invention in the accompanying drawing as illustrative of its concepts, it is obvious that such are exemplary and not exhaustive of its possible structural variation. The invention is not limited to utility in the mounting of tubular electronic units on sheet metal chassis, but may be employed in other fields where the mounted elements are of other sizes and shapes. I therefore intentionally claim my invention broadly, as indicated by the appended claims.

I claim:

1. A one-piece fitment of springy sheet metal, for attaching a tube to an apertured plate and for adjustably positioning a threaded stem extending from a member telescoped in the tube, said fitment comprising: an annulus for embracing the tube adjacent to one end thereof, a pair of oppositely positioned arms of arcuate cross-section extending from the annulus in position to resiliently clasp the side wall of the tube when the fitment and tube are telescopically assembled, said arms having portions which in unstressed condition are spaced by a distance substantially less than the exterior diameter of the tube, spring wings extending outwardly and downwardly from the ends of said arms for yieldingly engaging one surface of the plate when the fitment is telescoped into the aperture therein, latching tongues positioned between said arms and extending from the annulus in position to engage the opposite surface of the plate when the fitment is telescoped into the aperture therein, and resilient female thread means attached to the annulus and extending inwardly thereof for resiliently engaging the threaded stem.

2. A one-piece fitment of springy sheet metal, for attaching a tube to an apertured plate and for adjustably positioning a threaded stem extending from a member telescoped in the tube, said fitment comprising: an annulus for embracing the tube adjacent to one end thereof, oppositely positioned arms extending from the annulus in position to resiliently clasp the side wall of the tube when the fitment and tube are telescopically assembed, said arms having portions which in unstressed condition are spaced by a distance substantially less than the exterior diameter of the tube, spring wings extending outwardly from the ends of said arms for yieldingly engaging one surface of the plate when the fitment is telescoped into the aperture therein, latching tongues positioned between said arms and extending from the annulus in position to engage the opposite surface of the plate when the fitment is telescoped into the aperture therein, and female thread-engaging means attached to the annulus and extending inwardly thereof for engaging the threaded stem.

3. A one-piece fitment of springy sheet metal, for attaching a tube to an apertured plate and for adjustably positioning a threaded stem extending from a member telescoped in the tube, said fitment comprising: a web for overlying one end of the tube contiguous thereto, said web being formed with resilient female thread means for resiliently engaging the threaded stem, a pair of oppositely positioned arms of arcuate cross-section connected to said web and positioned to resiliently clasp the side wall of the tube when the fitment and tube are telescopically assembled, said arms having portions which in unstressed condition are spaced by a distance substantially less than the exterior diameter of the tube, spring wings extending outwardly and downwardly from the ends of said arms for yieldingly engaging one surface of the plate when the fitment is telescoped into the aperture therein, and latching tongues connected to said web and located between said arms in position to engage the opposite surface of the plate when the fitment is telescoped into the aperture therein.

4. A one-piece fitment of springy sheet metal, for attaching a rod-like member to an apertured plate, said fitment comprising: an annulus for embracing the rod-like member adjacent to one end thereof, a pair of oppositely positioned arms extending from the annulus in position to resiliently clasp the side wall of the rod-like member when the fitment and member are telescopically assembled, said arms having portions which in unstressed condition are spaced by a distance substantially less than the over-all thickness of the rod-like member, spring wings extending outwardly from the ends of said arms for yieldingly engaging one surface of the plate when the fitment is telescoped into the aperture therein, and latching tongues positioned between said arms and extending from the annulus in position to engage the opposite surface of the plate when the fitment is telescoped into the aperture therein.

5. A one-piece fitment of springy sheet metal, for attaching a rod-like member to an apertured plate, said fitment comprising: an annulus for embracing the rod-like member adjacent to one end thereof, a pair of oppositely positioned arms extending from the annulus in position to resiliently clasp the side wall of the rod-like member when the fitment and member are telescopically assembled, said arms having portions which in unstressed condition are spaced by a distance substantially less than the over-all thickness of the rod-like member, spring wings extending outwardly from the ends of said arms for yieldingly engaging one surface of the plate when the fitment is telescoped into the aperture therein, a downwardly-extending finger on at least one of the wings for engaging a secondary hole in the plate to thereby hold the fitment against rotation, and latching tongues positioned between said arms and extending from the annulus in position to engage the opposite surface of the plate when the fitment is telescoped into the aperture therein.

6. A one-piece fitment of springy sheet metal for adjustably positioning a threaded stem extending from a member telescoped in a tube, said fitment comprising: an annulus for embracing the tube adjacent to one end thereof, a pair of oppositely positioned arms of arcuate cross-section extending from the annulus in position to resiliently clasp the side wall of the tube when the fitment and tube are telescopically assembled, said arms having portions which in unstressed condition are spaced by a distance substantially less than the exterior diameter of the tube and the end portions of said arms flaring outwardly, and resilient female thread means attached to the annulus and extending inwardly thereof for resiliently engaging the threaded stem.

JOSEPH W. WOHLHIETER.